United States Patent
Becks et al.

(10) Patent No.: US 9,428,271 B2
(45) Date of Patent: Aug. 30, 2016

(54) DRAINING APPARATUS FOR DRAINING LIQUIDS FROM A VEHICLE, AIRCRAFT HAVING A DRAINING APPARATUS AND METHOD FOR DRAINING LIQUIDS FROM A VEHICLE

(71) Applicant: Airbus Operations GmbH, Hamburg (DE)

(72) Inventors: Ralf Becks, Buxtehude (DE); Raymond Lucas, Hamburg (DE)

(73) Assignee: Airbus Operations GmbH (DE)

( * ) Notice: Subject to any disclaimer, the term of this patent is extended or adjusted under 35 U.S.C. 154(b) by 239 days.

(21) Appl. No.: 14/101,532

(22) Filed: Dec. 10, 2013

(65) Prior Publication Data
US 2014/0158208 A1    Jun. 12, 2014

Related U.S. Application Data

(60) Provisional application No. 61/736,039, filed on Dec. 12, 2012.

(30) Foreign Application Priority Data

Dec. 12, 2012 (EP) .................................. 12196789

(51) Int. Cl.
*B64D 1/16* (2006.01)
*B64C 1/14* (2006.01)

(52) U.S. Cl.
CPC ............. *B64D 1/16* (2013.01); *B64C 1/1453* (2013.01); *Y10T 137/0318* (2015.04); *Y10T 137/6906* (2015.04)

(58) Field of Classification Search
CPC ............................... B64D 1/16; B64C 1/1453
See application file for complete search history.

(56) References Cited

U.S. PATENT DOCUMENTS

| 2,248,308 | A | * | 7/1941 | Rice | B64D 37/26 169/45 |
| 2,573,207 | A | * | 10/1951 | Lipman | B64D 37/26 244/135 R |
| 5,655,732 | A | * | 8/1997 | Frank | B63C 1/1453 239/171 |
| 7,731,127 | B2 | * | 6/2010 | Hoffjann | F16L 5/08 244/136 |
| 8,011,033 | B2 | * | 9/2011 | Wierenga | B60R 15/00 4/664 |
| 2010/0032525 | A1 | * | 2/2010 | Piesker | B64C 1/1453 244/136 |

FOREIGN PATENT DOCUMENTS

DE      44 08 493 C1      2/1995
DE      10 2005 022855 A1   12/2006
DE      10 2008 037142 A1    2/2010

* cited by examiner

*Primary Examiner* — Justin Benedik
(74) *Attorney, Agent, or Firm* — Lerner, David, Littenberg, Krumholz & Mentlik, LLP

(57) ABSTRACT

A draining apparatus for draining liquids from a vehicle includes a containment; a drain mast having an outlet opening and an inlet; and an actuator. The containment is adapted for being coupled with a structure of the vehicle, wherein the actuator is coupled with the drain mast and adapted for moving the drain mast into a retracted position and at least one extracted position relative to the containment, and wherein the containment is further adapted for accommodating the drain mast in the retracted position at least partially. The drainage apparatus has clear advantages regarding the parasitic drag compared to known drainage masts as it is only deployed into the flow when it is absolutely necessary.

11 Claims, 5 Drawing Sheets

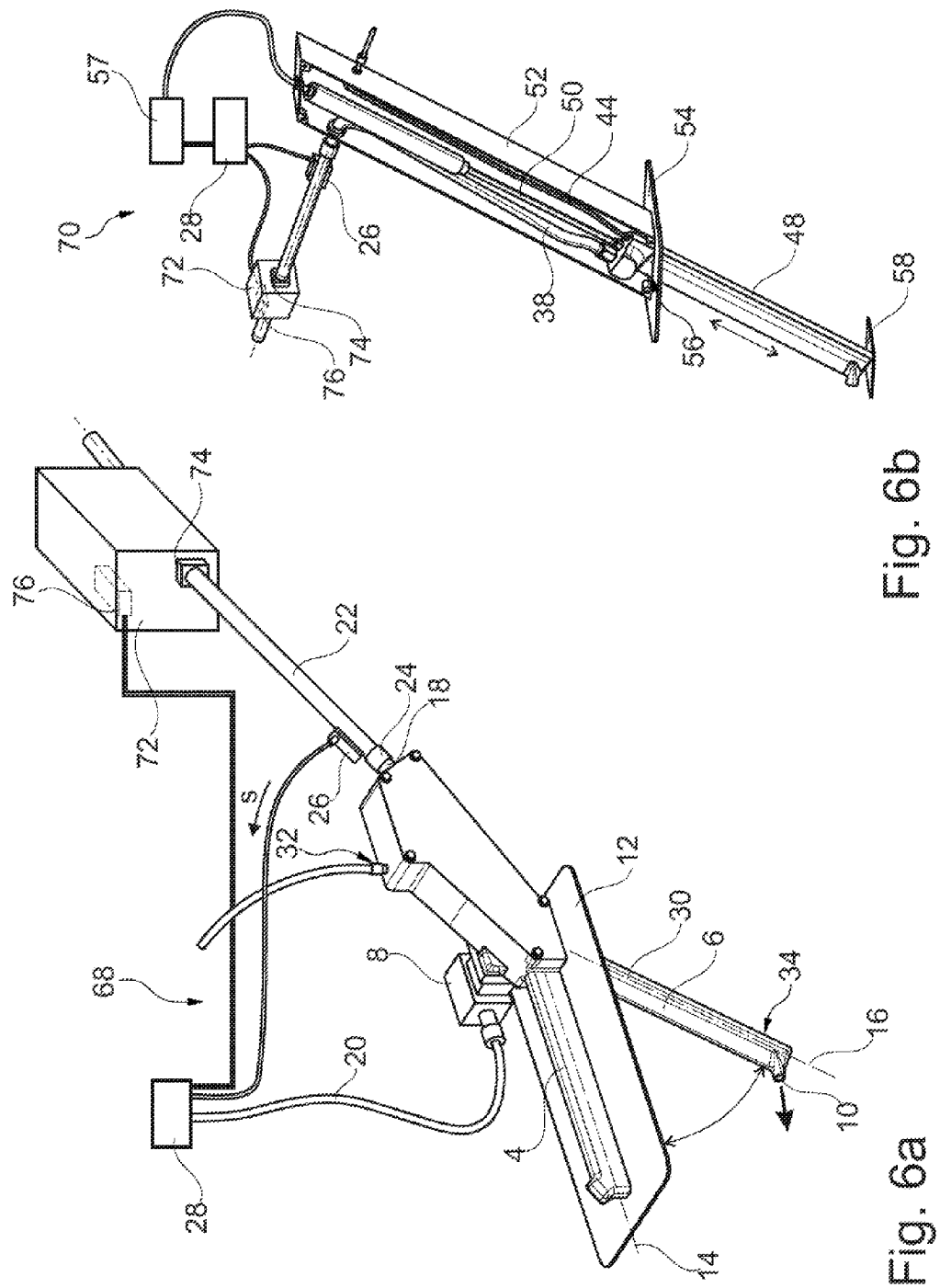

DRAINING APPARATUS FOR DRAINING LIQUIDS FROM A VEHICLE, AIRCRAFT HAVING A DRAINING APPARATUS AND METHOD FOR DRAINING LIQUIDS FROM A VEHICLE

CROSS-REFERENCE TO RELATED APPLICATIONS

This application claims the benefit of the filing date of U.S. Provisional Application No. 61/736,039, filed Dec. 12, 2012, the disclosure of which is hereby incorporated herein by reference.

TECHNICAL FIELD

The invention relates to a draining apparatus for draining liquids from a vehicle, an aircraft comprising a draining apparatus and a method for draining liquids from a vehicle.

BACKGROUND TO THE INVENTION

Liquids that arise during the operation of a vehicle may be stored on board the vehicle, used for various purposes or discharged the vehicle. While reusing liquids may be advantageous for the overall efficiency of an apparatus in which liquids arise and an apparatus in which liquids are consumed, it may also be advantageous to discharge liquids in order to reduce the effort for storing the liquid, and to reduce the weight of the vehicle if the respective liquids cannot be reused for other purposes.

For discharging liquids from an aircraft it is known to use so-called drain masts that may be located at an underside of the fuselage in an aft region. A drain mast usually comprises a discharge pipe that extends from the fuselage of the aircraft into the flow direction and through the boundary layer of the aerodynamic flow such that liquid may be discharged into the surrounding of the aircraft. For reducing the aerodynamic drag of the drain mast, the discharge pipe is surrounded by a fin-like fairing body having an aerodynamically advantageous shape and extending from the fuselage skin over the discharge pipe. Liquids to be discharged from an aircraft may for example include gray water from a galley and/or a drain of a washbasin.

For example, DE 44 08 493 C1 and DE 10 2005 022 855 A1 show known drain masts suitable for aircraft.

BRIEF SUMMARY OF THE INVENTION

The fairing of a drain mast is usually realized as a fixed and rigid component, which is connected to a fuselage skin of the aircraft. Therefore, it generates a parasitic aerodynamic drag during the whole flight even if liquids are discharged rather seldom. Over the whole life cycle of the aircraft this may lead to a noticeable additional consumption of fuel.

An aspect of the invention proposes a draining apparatus for draining liquids from a vehicle that provides a least possible aerodynamic drag in order to increase the overall efficiency of the vehicle.

A draining apparatus for draining liquids from a vehicle is proposed, comprising a containment, a drain mast, having an outlet opening and an inlet, and an actuator. The containment is adapted for being coupled with a structure of the vehicle. The actuator is coupled with the drain mast and adapted for moving the drain mast into a retracted position and at least one extracted position relative to the containment. The containment is further adapted for accommodating the drain mast in the retracted position at least partially.

A main characteristic of the draining apparatus according to an embodiment of the invention therefore lies in providing a movable drain mast that is positionable between a retracted position, in which it is accommodated in the containment, and one or more extended positions. As the containment is adapted for being coupled with a fuselage structure, the drain mast may, when the draining apparatus is mounted at a vehicle, be situated completely inside the vehicle body in its retracted position. In this state, an aerodynamic drag is not generated by the drain mast. In an extended position, the drain mast may extend from the vehicle body through the boundary layer of the flow around the vehicle body for discharging liquids through a boundary layer and may afterwards be moved back into its retracted position.

The containment may be understood as a casing that is attachable to a structure of the vehicle, for example a skin of a fuselage or a vehicle body. The containment may be designed such that there is an opening in the form of a cut-out, a slit or any other suitable opening, that allows the drain mast to enter and exit the containment.

The actuator may be based on a plurality of actuating principles and may include electric actuators having motor-driven mechanical elements, pneumatic actuators and hydraulic actuators. The mechanical elements driven by an electric motor may comprise a spindle and a nut, a gear assembly, an eccentric drive, etc., while the pneumatic and hydraulic actuators may include rotary and linear actuators directly connected to the drain mast or acting over a lever arrangement or a crank assembly onto the drain mast.

The drain mast may have appropriate dimensions that allow to reach a distance between the outlet of the drain mast and the skin of the aircraft exceeding 100 mm and more preferably exceeding 150 mm and for example about 200 mm. The invention is not limited to these exemplary measures and may depend on the actual design and aerodynamic characteristics of the aircraft and may therefore be higher or lower than these values.

The draining apparatus according to an embodiment of the invention is advantageous as an additional aerodynamic drag is only produced when a liquid is to be discharged the vehicle with the drain mast in an extended position.

In an advantageous embodiment, the containment comprises a coupling surface adapted for coupling the containment with a skin component of the vehicle. The coupling surface may for example be realized by flanges, protrusions or indentations that allow to provide a form locking, force locking or a bonding connection with the skin component of the vehicle. As the drain mast is provided for discharging off liquids to a surrounding of a vehicle, it is advantageous to mount the apparatus to a skin component such that the drain mast may extend through an opening of the skin component directly into the surrounding of the vehicle. It goes without saying that the containment is at least partially open to the surrounding of the vehicle and at least partially sealed to the inside of the vehicle.

In an advantageous embodiment, the drain mast is rotatably supported around a rotational axis, wherein the drain mast extends over the coupling surface facing away from the containment in at least one extended position. By a rotary extension principle of the drain mast, the overall dimensions of the apparatus that may extend into the inside of the fuselage or vehicle body may be limited, as the drain mast may lie flat at an outer, delimiting surface of the vehicle in a retracted position. Through a rather simple rotational motion it may be brought into an extending position in which it extends from the respective outer delimiting surface into the surrounding of the vehicle. The rotational axis may preferably intersect the containment.

It is preferred that the drain mast comprises a longitudinal component having a main extension direction and further having a projected covering surface extending along substantially the whole extension of the longitudinal component for covering a cut-out in the skin of the vehicle in a retracted position of the drain mast. The drain mast primarily realised as a longitudinal component may thereby constitute a discharge pipe with an outlet opening on one end and a projection that extends along the discharge pipe for providing an aerodynamically smooth surface in the respective cut-out of the skin of the vehicle. The aerodynamic drag that arises in an extended position is limited as the longitudinal component may have a rather small diameter that is not dimensioned for a permanent exposure to the dynamic pressure of the airflow surrounding the vehicle. In the retracted position the delimiting surface of the vehicle in a region of the drainage apparatus is completely smooth.

In a further advantageous embodiment, the drain mast comprises a first end and a second end, wherein the rotational axis is arranged at the first end and wherein the draining opening is arranged at the second end. The rotational axis may therefore be present in a range very near to the skin of the vehicle such that by rotating the drain mast around the rotational axis it is completely extended into the surrounding of the vehicle. The actuator may thereby be an electric rotary actuator having a gear arrangement coupled with an electric motor, a linear fluid actuator with a crank assembly or a rotary fluid actuator, wherein the overall motion of the drain mast between the retracted position and an outermost extended position is limited to clearly less than 90°.

In an advantageous embodiment, the drain mast is movable between a retracted position and an outermost extended position, which positions are distanced by an angle of 50° or less. The angle may thereby depend on the desired velocity of the vehicle and the size of the boundary layer resulting from the aerodynamic behaviour of the vehicle.

In another alternative embodiment, the drain mast is supported for conducting a translational motion relative to the containment, wherein the actuator is a linear actuator. On the one hand, the containment that accommodates the drain mast may clearly extend into the inside of the vehicle and may preferably enclose an angle to the surrounding inner side of the skin of the vehicle that preferably equals the angle of the drain mast in an extended position. On the other hand, the mechanical solution may in principle be slightly simpler and may require a smaller base surface.

Also, a drainage mast that is supported for conducting a translational motion may comprise a projected covering surface extending over a cross-sectional surface of the drain mast for covering a cut-out in the skin of the vehicle. In a retracted position, the drain mast thereby closes the cut-out by smoothly positioning the projected covering surface in the cut-out.

All of the above embodiments may comprise a flexible liquid line connected to the inlet of the drain mast and a fluid interface with a fixed installation position relative to the containment. As the apparatus in general and specifically the containment may constitute a compact unit, it is advantageous to provide all interfaces necessary for the operation of the apparatus according to the invention in spatially fixed positions. This improves the definition of connecting positions of pipings and ducts of other systems in the vehicle. As the inlet of the drain mast is rotatable or translatable, a flexible liquid line in between the drain mast inlet and the fluid interface provides a clear advantage for the operation of the drainage apparatus. The flexible line may be manufactured from a silicone material or any other material that is flexible and may withstand the temperature ranges that occur during the operation of the aircraft.

Especially in aircraft, the temperature at the skin and in the surrounding may clearly fall below the freezing point of water. Therefore, it is advantageous that the apparatus further comprises a heating apparatus at least on the drain mast, which heating apparatus is connected to an electric interface with a spatially fixed installation position relative to the containment. The drain mast thereby may be heated for preventing a freezing of liquids to be discharged and to prevent a bursting of the drain mast. The same applies to a flexible liquid line that may also comprise a heating apparatus realised by a heatable and flexible mesh or any other flexible and conductive coating.

In a still further embodiment, the apparatus comprises a level switch connectable to a liquid containing component upstream of the drain mast, wherein the level switch is couplable with the actuator in order to extend the drain mast when the level switch detects the presence of a liquid to be discharged. The level switch may for example be located in or on a pipeline or a buffer tank. If the level switch detects the presence of a liquid that has to be discharged, the actuator may be controlled such that the drain mast is extended to an extended position for allowing a drainage. The coupling between the level switch and the actuator may be realized by means of a control unit that controls the actuator and has an input connectable to the level switch. It goes without saying that the control unit does not need to be a dedicated control unit for the apparatus according to an embodiment of the invention. It may also be a function or sub-function of an already existing control unit in the vehicle.

A still further embodiment comprises a buffer tank upstream of the drain mast, in which buffer tank liquids to be discharged are collected. Thus, accumulated liquids may be discharged at once for reducing the overall deployment time of the drain mast.

Furthermore, the draining apparatus may comprise a valve upstream of the inlet of the drain mast for preventing liquid flow to the outlet of the drain mast. Such a valve is advantageous as the valve prevents liquid entering the drain mast when it is in a retracted state. The valve may be coupled with a control unit, such as the control unit that controls the motion of the drain mast, wherein the control unit should open the valve when the drain mast has reached the desired extended position and wherein the control unit should close the valve when the drain mast has left its extended position.

The valve may also be coupled with a level switch and/or a sensor that detects the presence of a liquid upstream of the valve. For example, the level switch may be connected to the actuator and the valve, wherein the valve or the level switch may comprise a delay device to induce the opening of the valve a predetermined time after the level switch sends a signal. This predetermined time may be adapted to the approximate time for an extension motion of the drain mast.

Alternatively, the drain mast may comprise a further sensor that detects the complete extension of the drain mast. Such an extension sensor may be coupled with the valve such that when the extension is detected the valve receives a signal that causes it to open.

The valve does not need to be an externally controlled valve. It may be advantageous to integrate valve components into a supporting structure of the drain mast and the drain mast or a component linked to the drain mast, such that the valve components are movably supported to each other. One of the valve components thereby comprises a flow opening and another valve component may be movable relative to the flow opening. When the drain mast reaches its desired extended position the flow opening is mechanically uncovered and the liquid may pass through the flow opening.

The invention also relates to an aircraft with a fuselage having a skin, wherein the apparatus according to an embodiment of the invention is attached to an inner side of the aircraft skin and wherein the containment is positioned above a cut-out of the fuselage skin.

The invention also relates to a method for draining liquids from a vehicle, comprising the steps of accumulating liquids upstream of the drain mast, extending the drain mast from a retracted position into an extended position, discharging the accumulated liquids and subsequently retracting the drain mast into a retracted position.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, irrespective of their composition in the individual claims or their interrelationships. Furthermore, identical or similar components in the figures have the same reference characters.

FIGS. 6a and 6b show a drainage apparatus in a schematic, block-oriented view.

DETAILED DESCRIPTION

Figure 1:
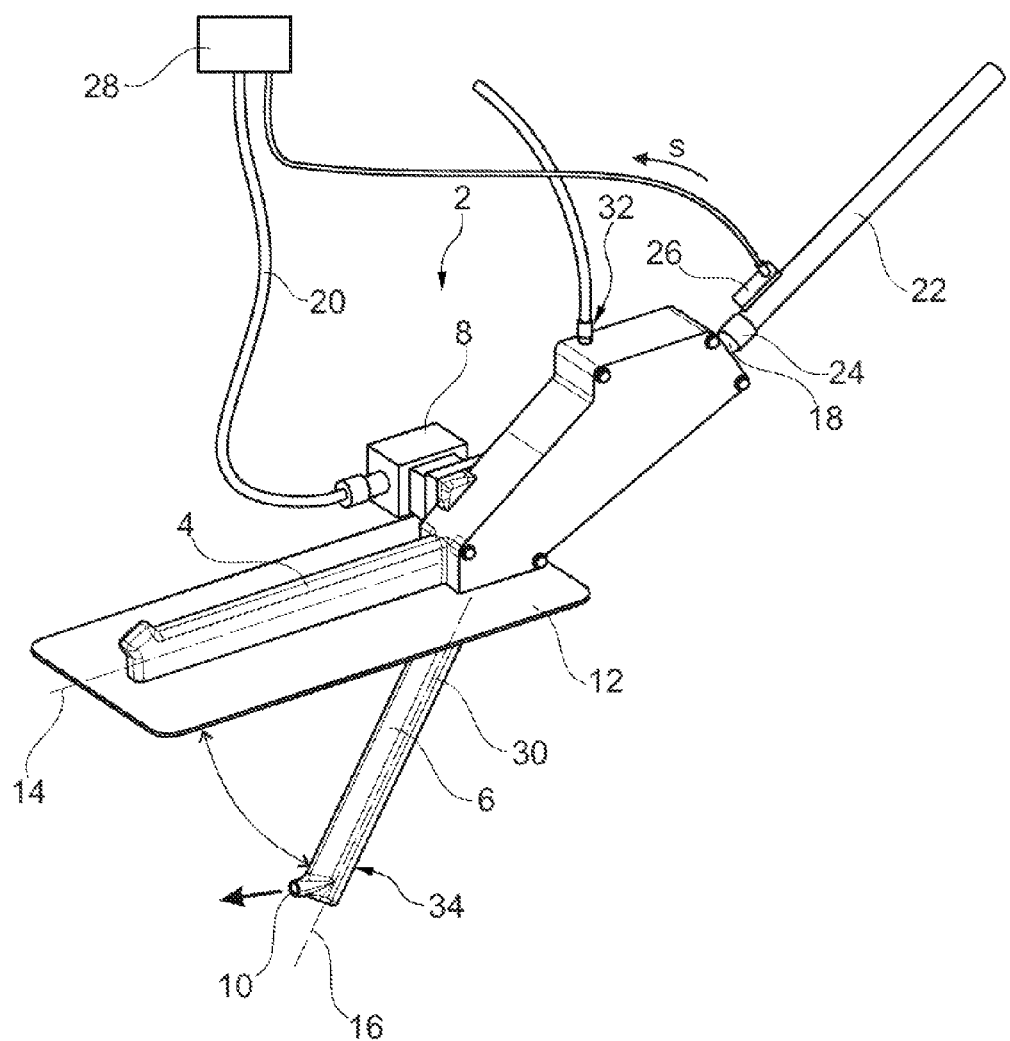
FIG. 1 shows a drainage apparatus in a three-dimensional view from an inside of a vehicle.

FIG. 1 shows a first embodiment of an apparatus 2 for draining liquids from a vehicle, comprising a containment 4, a drain mast 6 and an actuator 8, wherein the drain mast 6 has an outlet opening 10 and an inlet which is not visible in FIG. 1 in the chosen perspective. The containment 4 is adapted for being coupled with a structure 12 of the respective vehicle, wherein the structure 12 may be realized as a fuselage or vehicle body skin component. The actuator 8 is coupled with the drain mast 6 and is adapted for moving the drain mast 6 into a retracted position 14 and at least one extracted position 16. These positions 14 and 16 are shown by dashed lines parallel or equal to a longitudinal extension of the drain mast 6. The containment 4 is further adapted for accommodating the drain mast 6 such that it is completely inside the containment 4 in its retracted position.

As an exemplary embodiment, the actuator 8 is an electrical actuator connected to an actuator control line 20, which provides electrical power to the actuator 8. In a region upstream of the drain mast 6, a fluid interface 18 is present for connecting a discharge duct 22, through which liquid to be discharged the vehicle flows, to the apparatus 2. For connecting the discharge duct 22 and the fluid interface, a sleeve joint 24 may be used.

Furthermore, FIG. 1 shows a level switch 26 positioned at the discharge duct 22 in order to detect the accumulation of liquids and to send a level signal s to a control unit 28, which controls the actuator 8. The control unit 28 may be adapted for controlling the actuator 8 such that the drain mast 6 is held in a certain extended position depending on the presence of a signal s. Thereby, when a certain liquid level is present, the level switch 26 induces the extension of the drain mast 6 and, after the liquid has been discharged and the level switch 26 does not detect any liquid anymore and hence stops to transmit the signal s, the drain mast 6 is retracted again. Subsequently it is enclosed by the containment 4.

For the prevention of freezing of liquids in the drain mast 6, a heating apparatus 30 is integrated. For powering the heating apparatus 30, a heating power interface 32 is present. It may be advantageous to move the drain mast 6 from a retracted position to an extended position a predetermined time delay after providing electrical power to the heating apparatus 30 such that a potential freezing of incoming liquid and a clogging of the drain mast 6 may be prevented.

Figure 2:
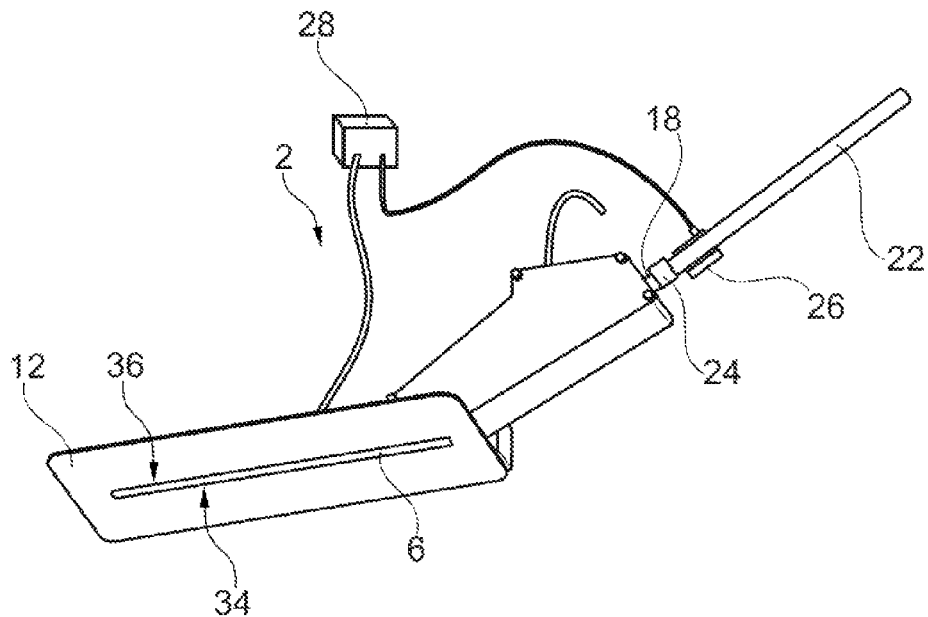
FIG. 2 shows a drainage apparatus in a three-dimensional view from an outside of a vehicle.

FIG. 2 shows the apparatus 2 integrated into a fuselage skin 12 of an aircraft from an underside of the skin 12. Here, the drain mast 6 is in a retracted position, in which a projecting covering surface 34 is clearly visible. The skin 12 comprises a recess or cut-out 36 that allows the extension of the drain mast 6 into the surrounding of the vehicle. Due to the fact that the drain mast 6 is delimited on one side by the projected covering surface 34, it may completely close and seal the cut-out 36 in a retracted position.

Figure 3:
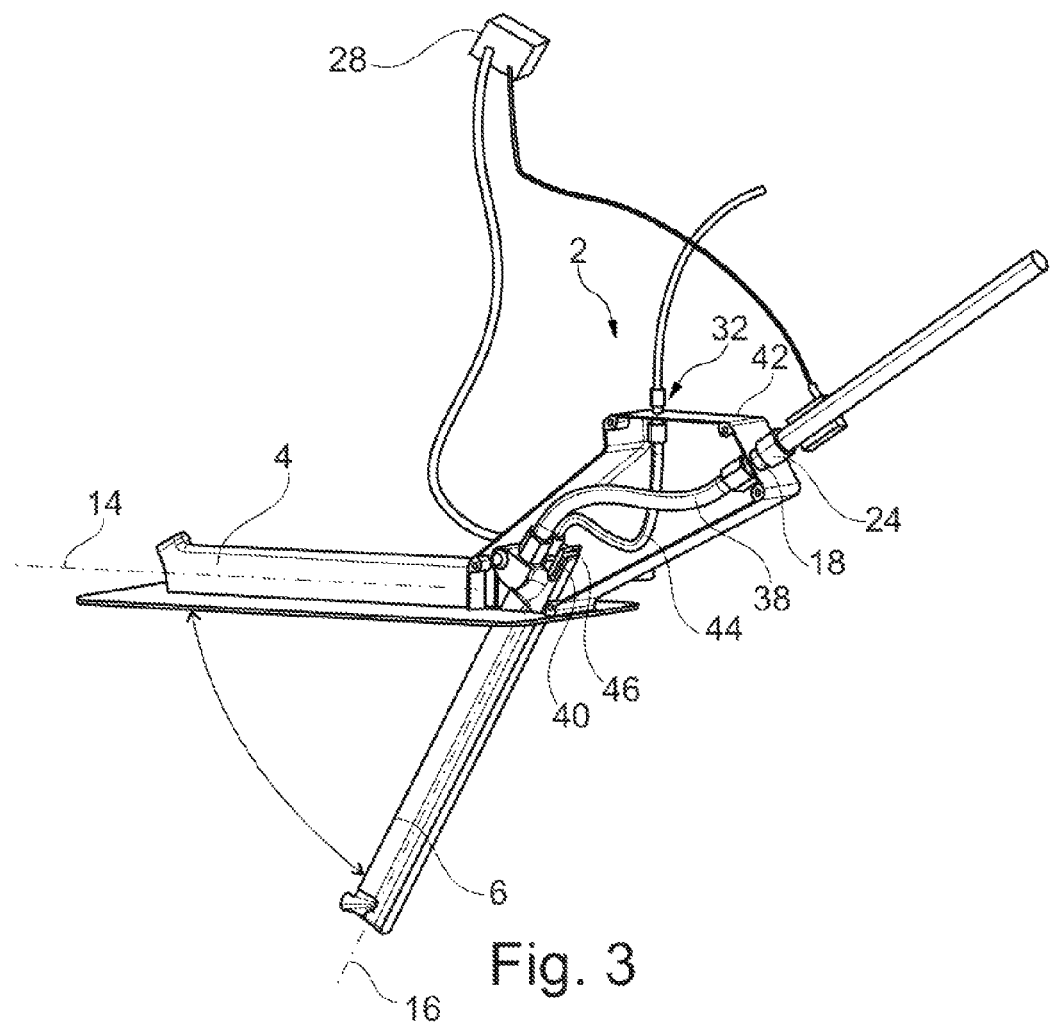
FIG. 3 shows a drainage apparatus in a three-dimensional view from an inside of a vehicle with a partial sectional view.

FIG. 3 shows the apparatus 2 from an inside where it is apparent that a flexible liquid line 38 connects the fluid interface 18 and an inlet 40 of the drain mast 6. In order to cover and protect the flexible fluid line 38 from mechanical or thermal damages, a housing 42 is provided. Besides the flexible fluid line 38, a flexible electrical line 44 is present that connects the supply port 32 for the heating apparatus 30 with a power supply inlet 46 of the drain mast.

Figure 4:
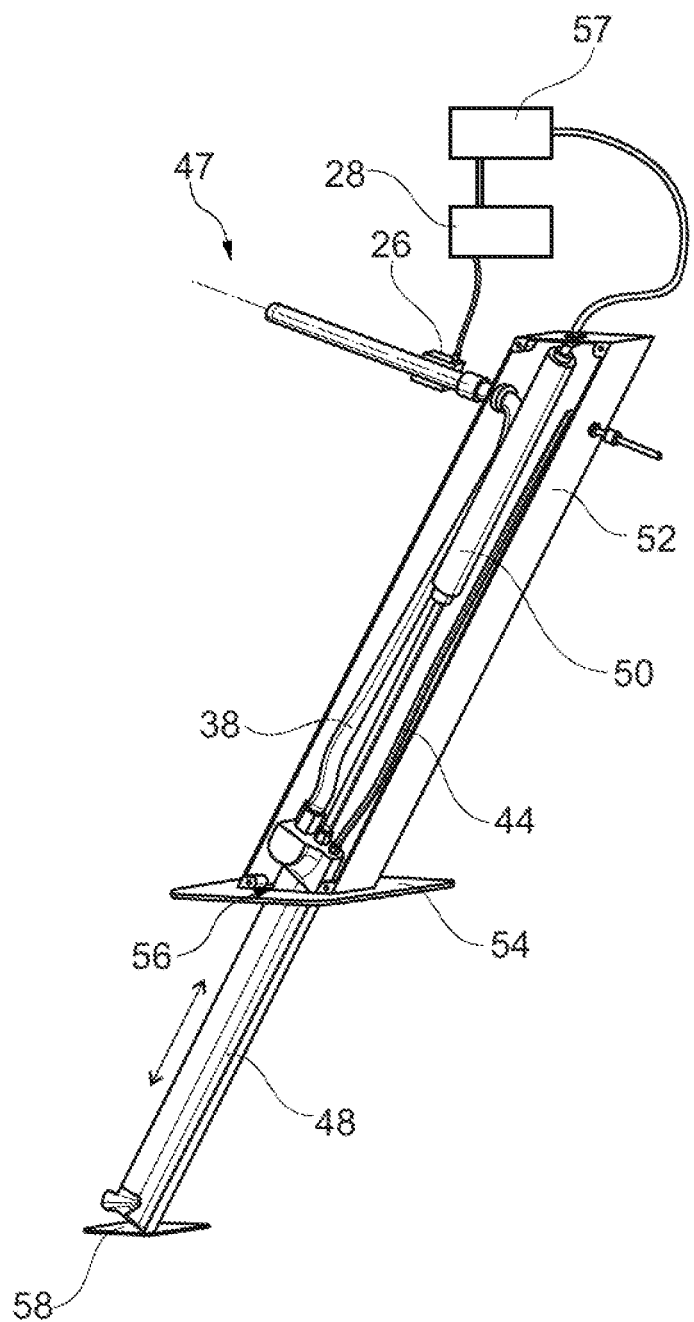
FIG. 4 shows a further embodiment of a drainage apparatus in a three-dimensional view with a partial sectional view.

FIG. 4 shows a draining apparatus 47 with a drain mast 48 that is linearly extendable and retractable by means of a linear actuator 50. The drain mast 48 is thereby enclosed by a containment 52, the dimensions of which correspond to the linear motion path of the drain mast 48 and also allow the flexible line 38 and the flexible electrical line 44 to fit when the drain mast 48 is in its retracted state. Hence, the containment may protrude further into the inner side of the vehicle, but may have a smaller base cross section.

Exemplarily, the containment 52 is coupled with a skin plate 54, which comprises a cut-out 56 through which the drain mast 48 may extend. In order to cover and/or seal this cut-out, the drain mast 48 has a projected covering surface 58 at an end, which has a shape that corresponds to the cut-out 56. Again, a flexible liquid line 38 and a flexible electric power line 44 are installed to provide liquid and power to the drain mast and its heating apparatus 30. The actuator 50 may be connected with a power source 57, e.g. a source of fluid power such as a compressed air line, a hydraulic network or any other means that is capable of driving the actuator 50. Also, the actuator 50 may be an electrical linear actuator and the power source 57 is an electrical power source. It goes without saying that the level switch 26 may be coupled with the power source 57 for inducing a motion of the actuator 50.

Figure 5:
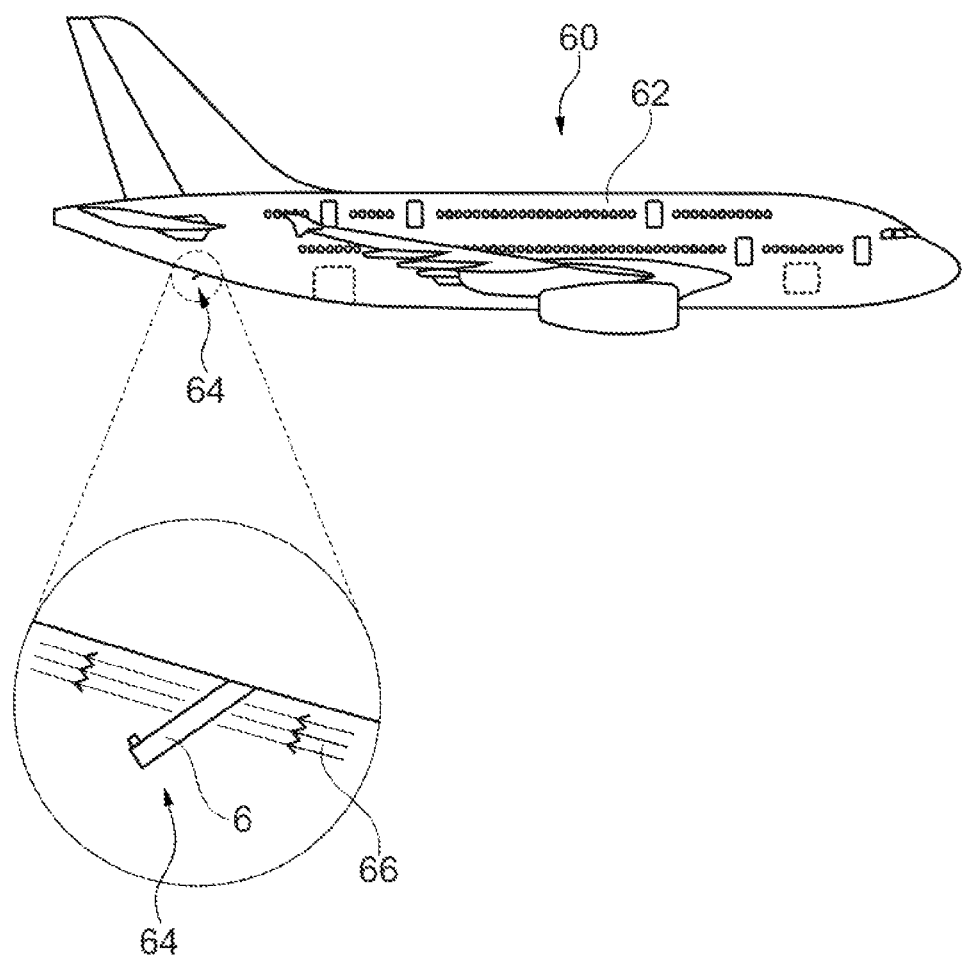
FIG. 5 shows an aircraft comprising a fuselage having a drainage apparatus.

FIG. 5 shows an aircraft 60 with a fuselage 62 and a drainage apparatus 64 positioned in an aft region of the fuselage 62 for draining liquids. The drain mast 6 of the apparatus 64 may be moved from a retracted position to one or more extended positions. In the drawing of FIG. 5, the drain mast 6 is designed to extend through the boundary layer 66 of the flow that surrounds the aircraft 60.

FIGS. 6*a* and 6*b* each show a draining apparatus 68 or 70 that are similarly designed as the draining apparatus 2 of FIG. 1 and draining apparatus 47 of FIG. 4. Both additionally include a buffer tank 72 in which liquid to be discharged is collected before it is discharged. As an exemplary embodiment, a valve 74 is integrated into each of the buffer tanks 72 that allow to prevent the flow of liquid into the inlet 18 of the drain masts 6 and 48 when they are in their retracted state. The valve 74 may also be integrated into the discharge duct 22 or any other means upstream from the inlet of the drain mast 6, 48. It goes without saying that the valve 74 may also be integrated into any component upstream of the drain mast of all other embodiments.

Further, the buffer tank 72 may also include a level switch 76 connectable to the control unit 28 in order to extend the drain mast 6, 48 when the liquid level inside the buffer tank 72 reaches a predetermined maximum.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A draining apparatus for draining liquids from a vehicle, comprising:
a containment;
a drain mast having an outlet opening and an inlet; and
an actuator;
wherein the containment is adapted for being coupled with a structure of the vehicle,
wherein the actuator is coupled with the drain mast and adapted for moving the drain mast into a retracted position and at least one extracted position relative to the containment,
wherein the containment is further adapted for accommodating the drain mast in the retracted position at least partially,
wherein the drain mast is rotatably supported around a rotational axis, wherein the drain mast extends over a coupling surface facing away from the containment at least in an extended position of the drain mast, and
wherein the drain mast comprises a longitudinal component having a main extension direction and further having a projected covering surface extending along substantially the whole extension of the longitudinal component for covering a cut-out in the skin of the vehicle in a retracted position of the drain mast.

2. The apparatus according to claim 1, wherein the containment comprises a coupling surface adapted for coupling the containment with a skin component of the vehicle.

3. The apparatus according to claim 1, wherein the drain mast comprises a first end and a second end,
wherein the rotational axis is arranged at the first end, and
wherein the drainage opening is arranged at the second end.

4. The apparatus according to claim 1, wherein the drain mast is movable between a retracted position and an outermost extended position, which positions are distanced by an angle of 50°.

5. The apparatus according to claim 1, wherein the drain mast is supported for conducting a translational motion relative to the containment, wherein the actuator is an axial actuator.

6. The apparatus according to claim 1, further comprising a flexible liquid line connected to the inlet of the drain mast and a fluid interface with a fixed installation position relative to the containment.

7. The apparatus according to claim 1, further comprising a heating apparatus at least on the drain mast connected to an electric interface with a spatially fixed installation position relative to the containment.

8. The apparatus according to claim 1, further comprising a level switch connectable to a liquid containing component upstream of the drain mast,
wherein the level switch is couplable to the actuator in order to extend the drain mast when the level switch detects the presence of a liquid to be discharged.

9. The apparatus according to claim 1, further comprising a buffer tank upstream of the drain mast, in which buffer tank the liquids to be discharged are collected to be discharged.

10. The apparatus according to claim 1, further comprising a valve upstream of the inlet of the drain mast for preventing liquid flow to the outlet of the drain mast.

11. An aircraft, comprising a fuselage having a skin and at least one apparatus , the apparatus comprising:
a containment;
a drain mast having an outlet opening and an inlet; and
an actuator;
wherein the containment is adapted for being coupled with a structure of the vehicle;
wherein the actuator is coupled with the drain mast and adapted for moving the drain mast into a retracted position and at least one extracted position relative to the containment;
wherein the containment is further adapted for accommodating the drain mast in the retracted position at least partially;
wherein the apparatus is attached to an inner side of the aircraft skin and wherein the containment is positioned above a cut-out of the fuselage skin;
wherein the drain mast is rotatably supported around a rotational axis, wherein the drain mast extends over a coupling surface facing away from the containment at least in an extended position of the drain mast, and
wherein the drain mast comprises a longitudinal component having a main extension direction and further having a projected covering surface extending along substantially the whole extension of the longitudinal component for covering a cut-out in the skin of the vehicle in a retracted position of the drain mast.

* * * * *